United States Patent
Tang et al.

(10) Patent No.: US 10,511,468 B2
(45) Date of Patent: Dec. 17, 2019

(54) ITERATIVE FREQUENCY OFFSET ESTIMATION IN WIRELESS NETWORKS

(71) Applicant: INTEL IP CORPORATION, Santa Clara, CA (US)

(72) Inventors: Yunshuai Tang, Xi'an (CN); Yanzeng Fu, Xi'an (CN); Hong Zhang, Xi'an (CN); Jie Lei, Xi'an (CN); Zhen Wang, Xi'an (CN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/750,782

(22) PCT Filed: Sep. 9, 2016

(86) PCT No.: PCT/US2016/051070
§ 371 (c)(1),
(2) Date: Feb. 6, 2018

(87) PCT Pub. No.: WO2017/044824
PCT Pub. Date: Mar. 16, 2017

(65) Prior Publication Data
US 2018/0227153 A1    Aug. 9, 2018

(30) Foreign Application Priority Data
Sep. 9, 2015 (WO) ................. PCT/CN2015/089230

(51) Int. Cl.
*H04L 27/00* (2006.01)
*H04L 25/02* (2006.01)
(Continued)

(52) U.S. Cl.
CPC .......... *H04L 27/0014* (2013.01); *H04L 25/02* (2013.01); *H04L 25/03159* (2013.01);
(Continued)

(58) Field of Classification Search
CPC combination set(s) only.
See application file for complete search history.

(56) References Cited

U.S. PATENT DOCUMENTS

| 5,276,706 A * | 1/1994 | Critchlow | ................. H03J 7/04 375/343 |
| 2003/0108126 A1 | 6/2003 | Akopian | |

(Continued)

FOREIGN PATENT DOCUMENTS

KR    20140011257 A    1/2014

OTHER PUBLICATIONS

3GPP TR 45.820 V2.1.0 (Aug. 2015); "Technical Specification Group GSM/EDGE Radio Access Network; Cellular System Support for Ultra Low Complexity and Low Throughput Internet of Things; (Release 13)" 524 pages.

(Continued)

*Primary Examiner* — Junpeng Chen
(74) *Attorney, Agent, or Firm* — Schwabe, Williamson & Wyatt, P.C.

(57) ABSTRACT

An apparatus to estimate a frequency offset in wireless networks is provided. The apparatus comprises: radio frequency (RF) circuitry to down-convert a signal from a base station to generate in-phase and quadrature (IQ) components, wherein the signal includes one or more repeated bursts; and a frequency offset estimator operatively coupled to the RF circuitry, the frequency offset estimator to estimate a frequency offset based on the IQ components and an iterative calculation of phase differences between different sets of bursts of the one or more repeated bursts.

19 Claims, 8 Drawing Sheets

(51) Int. Cl.
H04L 27/26 (2006.01)
H04L 25/03 (2006.01)
(52) U.S. Cl.
CPC ........ *H04L 25/03821* (2013.01); *H04L 27/26* (2013.01); *H04L 2025/03611* (2013.01); *H04L 2027/0026* (2013.01); *H04L 2027/0067* (2013.01)

(56) References Cited

U.S. PATENT DOCUMENTS

| | | |
|---|---|---|
| 2006/0281433 A1 | 12/2006 | Yang et al. |
| 2013/0136216 A1 | 5/2013 | Shirakata et al. |
| 2014/0023164 A1* | 1/2014 | Oh .......................... H04L 27/14 375/334 |
| 2014/0169504 A1 | 6/2014 | Smail |

OTHER PUBLICATIONS

Ericsson et al.; "New Work Item on Extended Coverage GSM (EC-GSM) for support of Cellular Internet of Things," Agenda Item: 11.1, 3GPP TSG GERAN#67 GP-151039; Yinchuan, P.R. China, Aug. 10-14, 2015; (Revision of GP-150994), 7 pages.

International Search Report and Written Opinion for International Patent Application No. PCT/US2016/051070 dated Dec. 16, 2016; 14 pages.

* cited by examiner

ITERATIVE FREQUENCY OFFSET ESTIMATION IN WIRELESS NETWORKS

CROSS REFERENCE TO RELATED APPLICATIONS

The present application is a national phase entry under 35 U.S.C. § 371 of International Application No. PCT/US2016/051070, filed Sep. 9, 2016, entitled "ITERATIVE FREQUENCY OFFSET ESTIMATION IN WIRELESS NETWORKS", which claims priority to PCT/CN2015/089230 filed Sep. 9, 2015.

FIELD

Implementations of the claimed invention generally relate to the field of wireless communications, and in particular, to iterative frequency offset estimation in wireless communication networks.

BACKGROUND

Extended coverage-Global System for Mobile Communication ("EC-GSM") is technology utilized to facilitate realization of Cellular Internet of Things ("CIoT") in order to support networking of Internet of Things ("IoT") devices that may be associated with low complexity and throughput.

In EC-GSM, the signal levels may be very low, which may result in an input signal to noise ratio ("SNR") being too low for a legacy GSM equalizer to work properly. In-phase/quadrature ("IQ") accumulation has been proposed to increase the SNR before the equalizer. However, IQ accumulation is very sensitive to a frequency offset. Sometimes, five or ten Hz frequency offset may lead to an obvious performance degradation. Thus, a powerful frequency offset estimation ("FOE") algorithm may be desired to provide accurate frequency offset estimation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
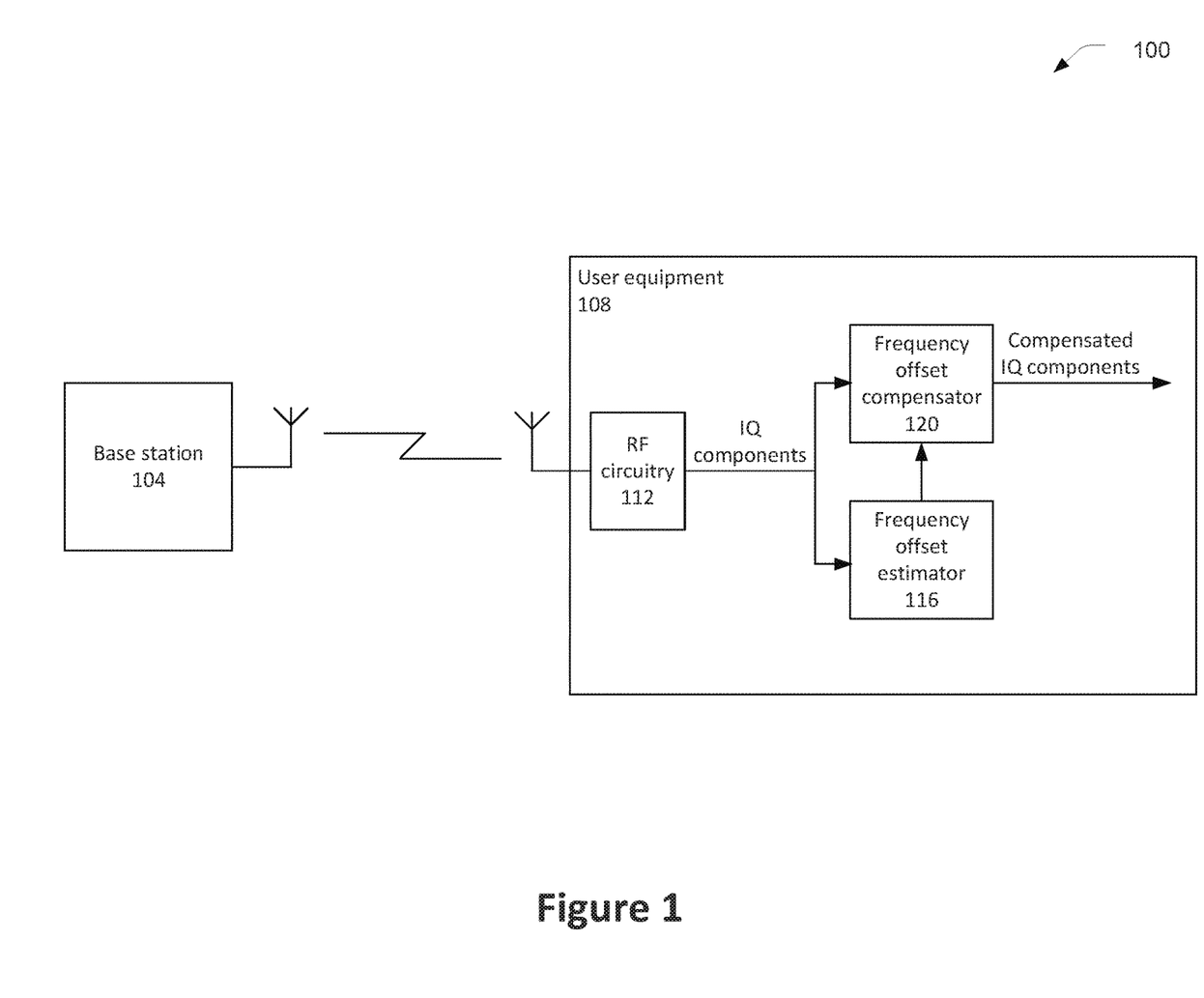
FIG. 1 illustrates a wireless system in accordance with some embodiments.

FIG. 1 illustrates a wireless system 100 in accordance with some embodiments. The wireless system 100 may include a base station 104 in wireless communication with a user equipment ("UE") 108. The base station 104 may be an evolved node B ("eNB") of a wireless access network such as, but not limited to, a global system for mobile communications ("GSM") network, an evolved universal terrestrial access network ("EUTRAN"), a 5G network, etc. The UE 108 may be any device that may be used by an end user to communicate with the access network.

In some embodiments, the UE 108 may be an IoT device that is designed to collect data and report the data to a network through, for example, the base station 104. The UE 108 may be employed in any of a variety of deployment scenarios including, but not limited to, mobile devices, security devices, wearable devices, object tracking devices, utility metering devices, connected healthcare devices, city infrastructure devices, utility metering devices, environmental monitoring devices, vehicle devices, energy management devices, and smart building devices. In other embodiments, the UE 108 may be another type of UE.

In embodiments in which the UE 108 is an IoT device, the base station 104 may attempt to enhance coverage of the user equipment 108 as compared to legacy general packet radio service ("GPRS") devices. In some embodiments, compared with legacy GPRS solutions, it may be desirable for the system 100 to achieve a 20 dB coverage extension for IoT devices. The base station 104 may use blind repetition to extend the coverage in some embodiments. In blind repetition, the base station 104 may send repeated bursts up to, for example, 28 times without feedback from the remote end.

As briefly described above, IQ accumulation may be used for blind repetition in order to increase the SNR before an equalizer to facilitate operation of the equalizer. In light of the IQ accumulation sensitivity to frequency offset an accurate FOE algorithm may be desired.

A phase difference between repeated bursts may be used in an FOE algorithm to estimate a frequency offset. However, longer distances between bursts that are used in the estimation may result in smaller ranges in which a frequency offset may be accurately determined (hereinafter "an estimation range"). For example, an extended coverage synchronization channel ("EC-SCH") may have seven repeated bursts in one multi-frame.

Figure 2:
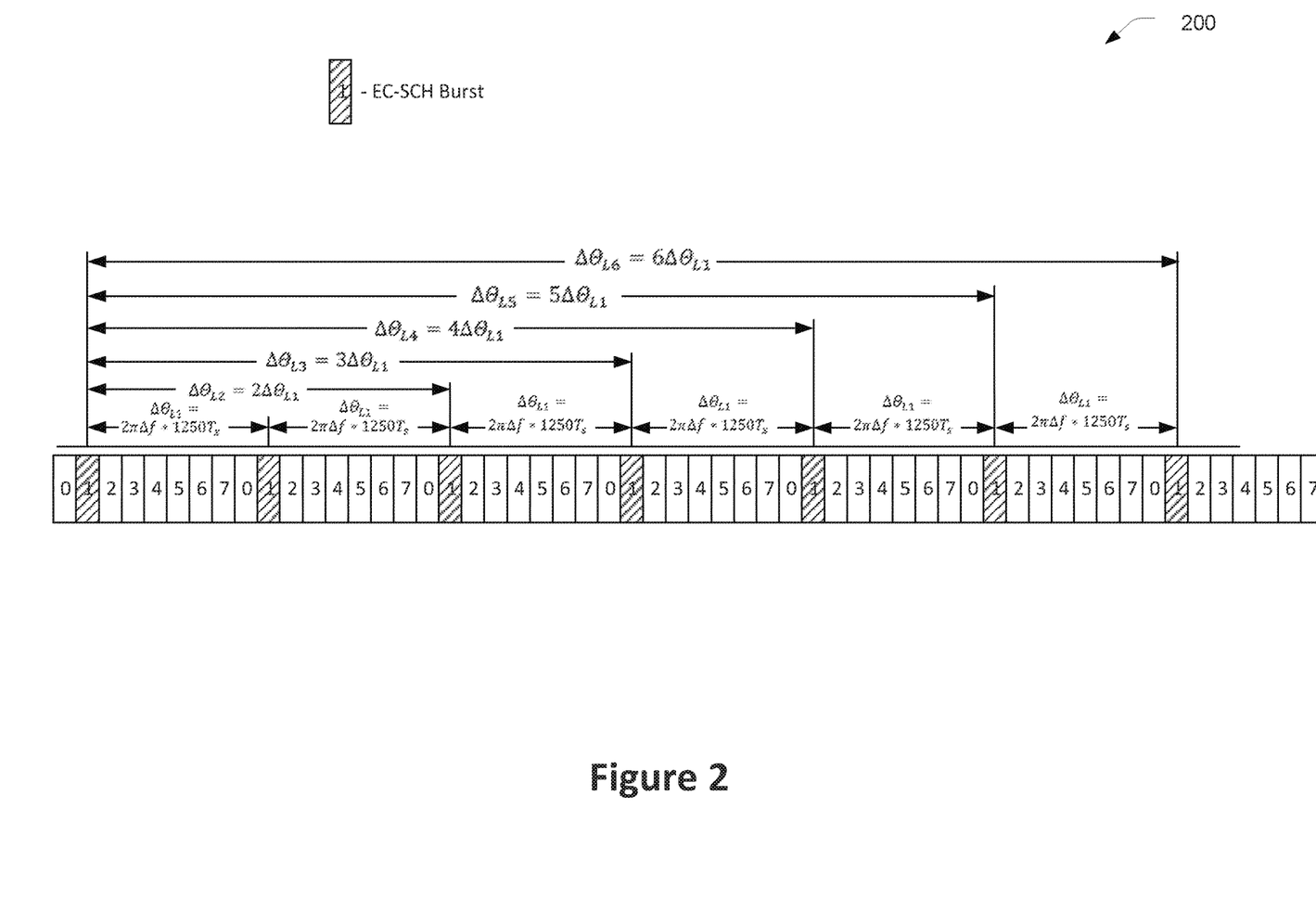
FIG. 2 illustrates a burst map of an extended coverage synchronization channel in accordance with some embodiments.

See, for example, burst map 200 of an EC-SCH in one multi-frame and its phase shift caused by frequency offset as shown in FIG. 2 in accordance with some embodiments. The repeated EC-SCH bursts are shown in cross-hatch. If the phase difference between adjacent bursts is used to estimate a frequency offset, the estimation range will only be only −108-108 hertz ("Hz"). Such an estimation range is already very small and may complicate operations of various components used for frequency correction channel ("FCCH") detection, for example. Increasing the distance between the used bursts will lead to an even smaller estimation range, which will further complicate operation of components of the device.

The UE 108 may include RF circuitry 112 operatively coupled to a frequency offset estimator 116 and a frequency offset compensator 120. The RF circuitry 112 may use a local oscillator signal for converting a raw radio-frequency or intermediate frequency signal down to a complex baseband signal having IQ components. If the local oscillator signal does not synchronize with the carrier signal contained in the received signal, a frequency offset may occur. The carrier frequency offset may result from a frequency mismatch between oscillators in the base station 104 and the UE 108 or from a Doppler effect as the UE 108 is moving relative to the base station. In order to maintain orthogonality among the subcarriers and avoid inter-carrier interference ("ICI"), the UE 108 may include the frequency offset estimator 116 and the frequency offset compensator 120 to respectively estimate and compensate for the carrier frequency offset.

To at least partially address the issues discussed above with respect to IQ sensitivity to frequency offset, the frequency offset compensator 120 may use an iterative FOE algorithm that uses bursts with much longer distance without decreasing an estimation range. The simulation results show the FOE accuracy and overall performance is improved.

Referring again to FIG. 2, the EC-SCH is shown with seven repeated bursts, with the EC-SCH bursts being transmitted on a first time slot ("TS1") in each of the seven time division multiple access ("TDMA") frames. The distance between two adjacent bursts is 1250 $T_s \approx 1250*1/270{,}833$ seconds, where $T_s$ is a basic time unit. The phase shift between adjacent bursts may then be given by:

$$\Delta\theta_{L1} = 2\pi\Delta f * 1250 T_s \in [-\pi, \pi). \quad \text{Equation 1}$$

With the above formula, the maximum estimated frequency offset for adjacent bursts may be:

$$\Delta f_{L1} = \frac{\pm\pi}{2\pi * 1250 T_s} = \pm\frac{1}{2*1250*\frac{1}{27833}} \approx \pm 108.3 \text{ Hz}. \quad \text{Equation 2}$$

In the same way, the maximum estimated frequency offset with 2/3/4/5/6/burst length may be:

$$\Delta f_{Ln} = \frac{\pm\pi}{2\pi * n * 1250 T_s} = \pm\frac{108.3}{n} \text{Hz}. \quad \text{Equation 3}$$

If the distance is six bursts, that is, n=6, then the estimation range may only be −18.05-18.05 Hz.

The FOB algorithm used by the frequency offset estimator 116 may estimate the frequency offset based on an iterative calculation of phase differences between different sets of bursts of the repeated bursts. This iterative FOE algorithm may improve the accuracy of the estimation step-by-step without sacrificing the estimation range.

Figure 3:
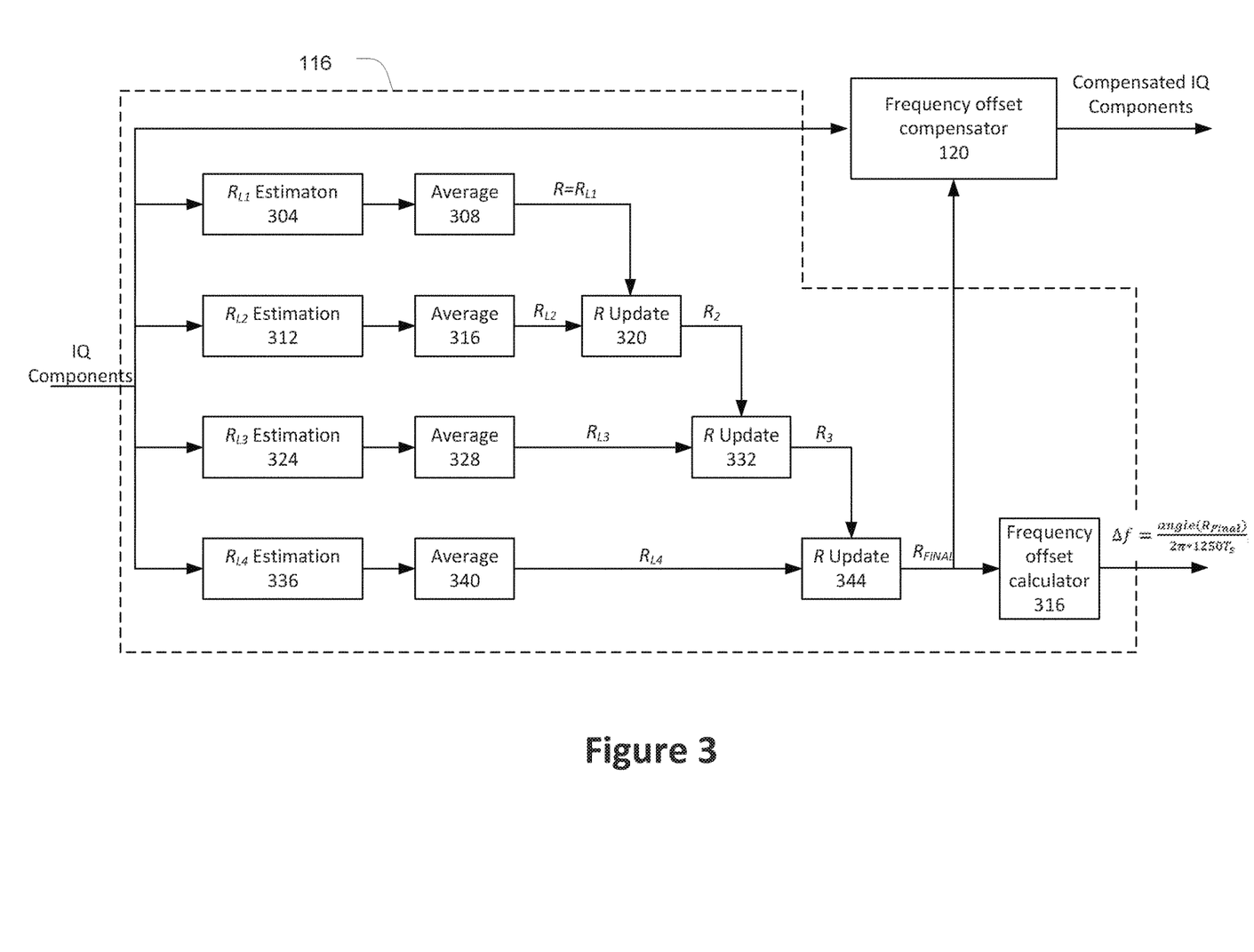
FIG. 3 illustrates components of a user equipment in accordance with some embodiments.

FIG. 3 illustrates components of the UE 108 in more detail in accordance with some embodiments. In particular, the frequency offset estimator 116 is shown with operational blocks extrapolated for explanation.

The frequency offset estimator 116 may calculate phase shifts caused by frequency offset with different distances. Assume a signal of the $j^{th}$ burst is x(j,k), where k denotes a sample index in the burst. Since the data carried in the bursts is the same, the signal may be expressed as:

$$x(j,k) = e^{2\pi\Delta f *(1250+k) T_s * 1i} \Sigma_{i=0}^{L-1} h(j,i) * s(k-i) + w(j,k). \quad \text{Equation 4}$$

Here, h(j,i) is the $i^{th}$ channel tap at burst j, and w(j,k) is the noise in burst j.

Since an EC-GSM system may be designed for low-mobility usage, the channel in the repeated bursts may be treated as approximately stationary. For simplification, we may use a same channel in the following calculations.

The iterative FOE algorithm may be depicted with the following formulas in which M is an assigned iteration number. For EC-SCH, M≤6. For the embodiment depicted in FIG. 3, the assigned iteration number is four.

Preliminarily, a level-n phasor ("$R_{Ln}$") carrying the phase difference with different distances may be calculated using:

$$R_{Ln} = \frac{1}{M} \sum_{j=n}^{M-1} \sum_{k=0}^{N-1} x(j,k) * conj(x(j-n,k)), \quad \text{Equation 5}$$

$$n = 1, 2, \ldots, M,$$

where x(j,k) is the $k^{th}$ sample of the $j^{th}$ burst, and N is a number of data used for frequency offset estimation in one burst.

With our given assumption $x(j,k) \approx x(j-n,k) * e^{2\pi\Delta f * n * 1250 T_s * 1i}$, then Equation 5 may be approximately equal to $$R_{Ln} = \frac{1}{M} \sum_{j=n}^{M-1} \sum_{k=0}^{N-1} x(j-n,k) * \quad \text{Equation 6}$$

$$e^{2\pi\Delta f * n * 1250 T_s * 1i}) * conj(x(j-n,k))$$

$$= \frac{1}{M} \sum_{j=n}^{M-1} \sum_{k=0}^{N-1} x P_s e^{2\pi\Delta f * n * 1250 T_s * 1i}$$

$$= N * P_s e^{2\pi\Delta f * n * 1250 T_s * 1i}$$

$$= K * e^{2\pi\Delta f * n * 1250 T_s * 1i},$$

where $P_s$ is a signal power of the received signal, and K=N*$P_s$.

The frequency offset estimator 116 may perform an estimation of a level-1 phasor ("$R_{L1}$"), at 304 using Equation 5 or 6, based on the IQ data of the received signal. In some embodiments, the frequency offset estimator 116 may determine an average of a number of level-1 phasor estimations at 308 and use the average as $R_{L1}$. The averaging operation corresponds to the first summation of Equation 5. Following the averaging at 308, or the $R_{L1}$ estimation at 304 if averaging is not present, the frequency offset estimator 116 may set a phasor ("R") equal to the level-1 phasor, $R=R_{L1}$.

The frequency offset estimator 116 may also perform an estimation of a level-2 phasor ("$L_2$"), at 312 using Equations 5 or 6, based on the IQ data of the received signal. In some embodiments, the frequency offset estimator 116 may determine an average of a number of level-2 phasor estimations at 316 and use the average as $R_{L2}$. Following the averaging at 316, or the $R_{L2}$ estimation at 312 if averaging is not present, the frequency offset estimator 116 may perform the first iterative updating of the phasor at 320.

To iteratively update the phasor, the frequency offset estimator 116 may use the following equation:

$$R_n = R_{n-1} * e^{\frac{angle(R_{Ln})*conj(R_{n-1})^n}{n}j}, n = 1, 2, \ldots, M. \quad \text{Equation 7}$$

The angle(*) is an operation to calculate a phase of one complex value, $R_n$ represents the iteratively updated phasor of the $n^{th}$ iteration, and the $R_{n-1}$ represents the iteratively updated phasor of the iteration just before the $n^{th}$ iteration. Following the R update at 320, the updated phasor of the $2^{nd}$ iteration, $R_2$, may be provided.

The frequency offset estimator 116 may perform the iterative updates of the phasor until an assigned iteration number M; four in the illustrated embodiment.

The iterative updates of the frequency offset estimator 116 may be similar to that described above with respect to $R_{L2}$. In particular, the frequency offset estimator 116 may include $R_{L3}$ estimation at 324, optional averaging at 328, phasor update at 332, $R_{L4}$ estimation at 336, optional averaging at 340, and phasor update at 344.

The phasor update at 344 may result in a final phasor, $R_{Final}$ or $R_M$, that is provided to a frequency offset calculator 348. The frequency offset calculator 348 may calculate the frequency offset with the final phasor value based on the following equation:

$$\Delta f = \frac{angle(R_M)}{2\pi * 1250 T_s}. \quad \text{Equation 8}$$

In some embodiments, the frequency offset calculator 316 may provide the frequency offset calculation to a component that is to compensate for an oscillator in the next receiving period.

In some embodiments, the frequency offset compensator 120 may receive the final phasor or the frequency offset calculation and compensate for the offset to provide compensated IQ components in the same receiving period in which the IQ components are received.

In general, for each iteration, an estimated frequency offset $\Delta f$ carried in the phasor may be improved. However, there may be other factors that impact the estimation accuracy. For example, the larger the n value used, the less samples may be used in the $R_{Ln}$ calculation of Equations 5 or 6. Thus, the number of iterations used in the estimation may be a trade-off. In some embodiments, simulations may provide an indication of a desired number of iterations.

Figure 4:
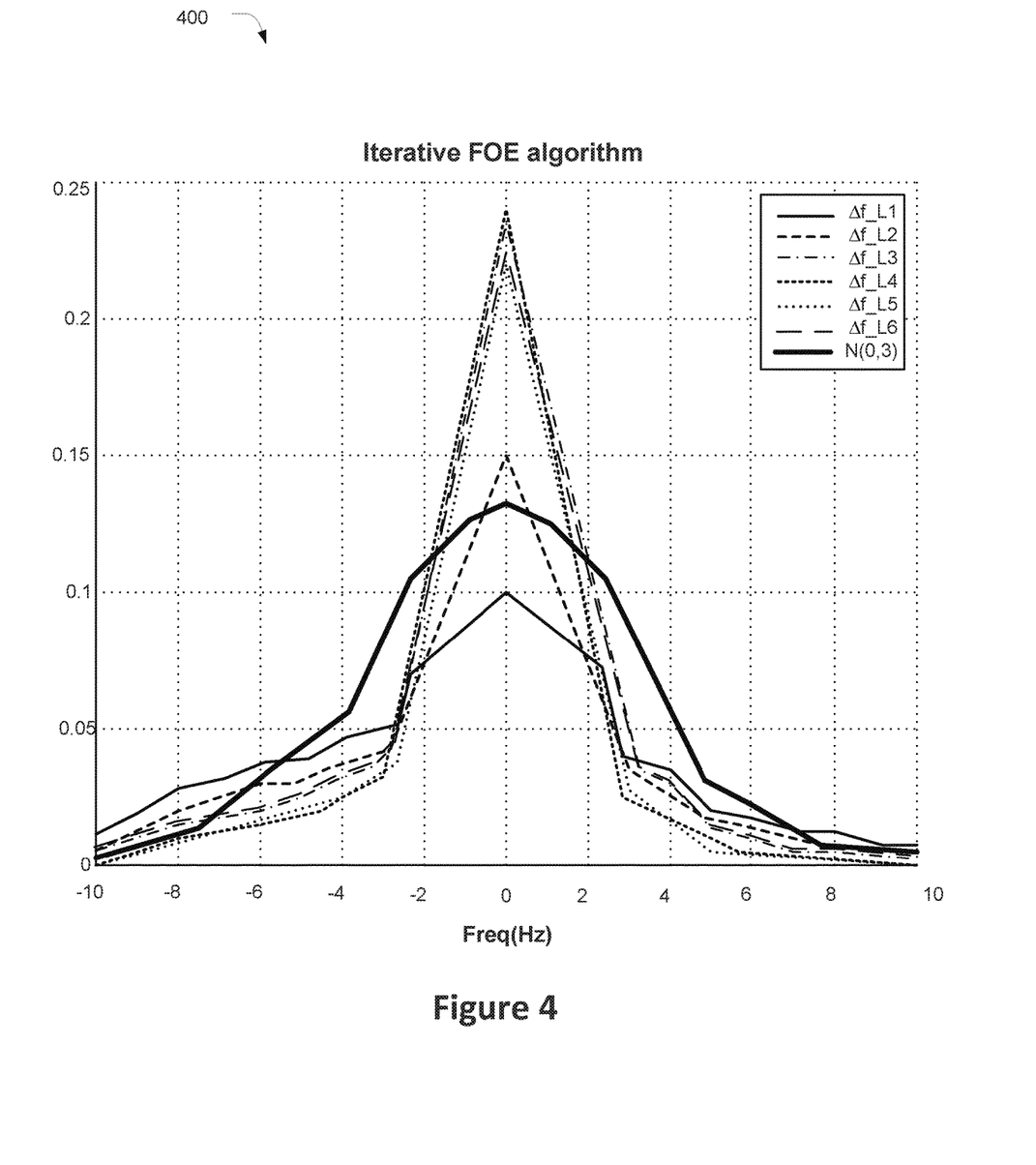
FIG. 4 illustrates a probability density function of estimated frequency offset errors with different iteration numbers for a logical channel in accordance with some embodiments.

FIG. 4 illustrates a probability density function ("PDF") of estimated frequency offset errors with different iteration numbers for a logical channel such as an EC-SCH in accordance with some embodiments. In the Figure, $\Delta f\_L1$ corresponds to a legacy estimation; $\Delta f\_L2$ corresponds to a two-iteration estimation; $\Delta f\_L3$ corresponds to a three-iteration estimation; $\Delta f\_L4$ corresponds to a four-iteration estimation; $\Delta f\_L5$ corresponds to a five-iteration estimation; $\Delta f\_L6$ corresponds to a six-iteration estimation, and $N(0,3)$ corresponds to a normal distribution with 0 mean and variance 3. As can be seen, three or four iterations may achieve a desired performance as compared with the legacy estimation. The estimated frequency offset of the three- and four-iteration estimations are more concentrated and even better than the $N(0,3)$ distribution.

Figure 5:
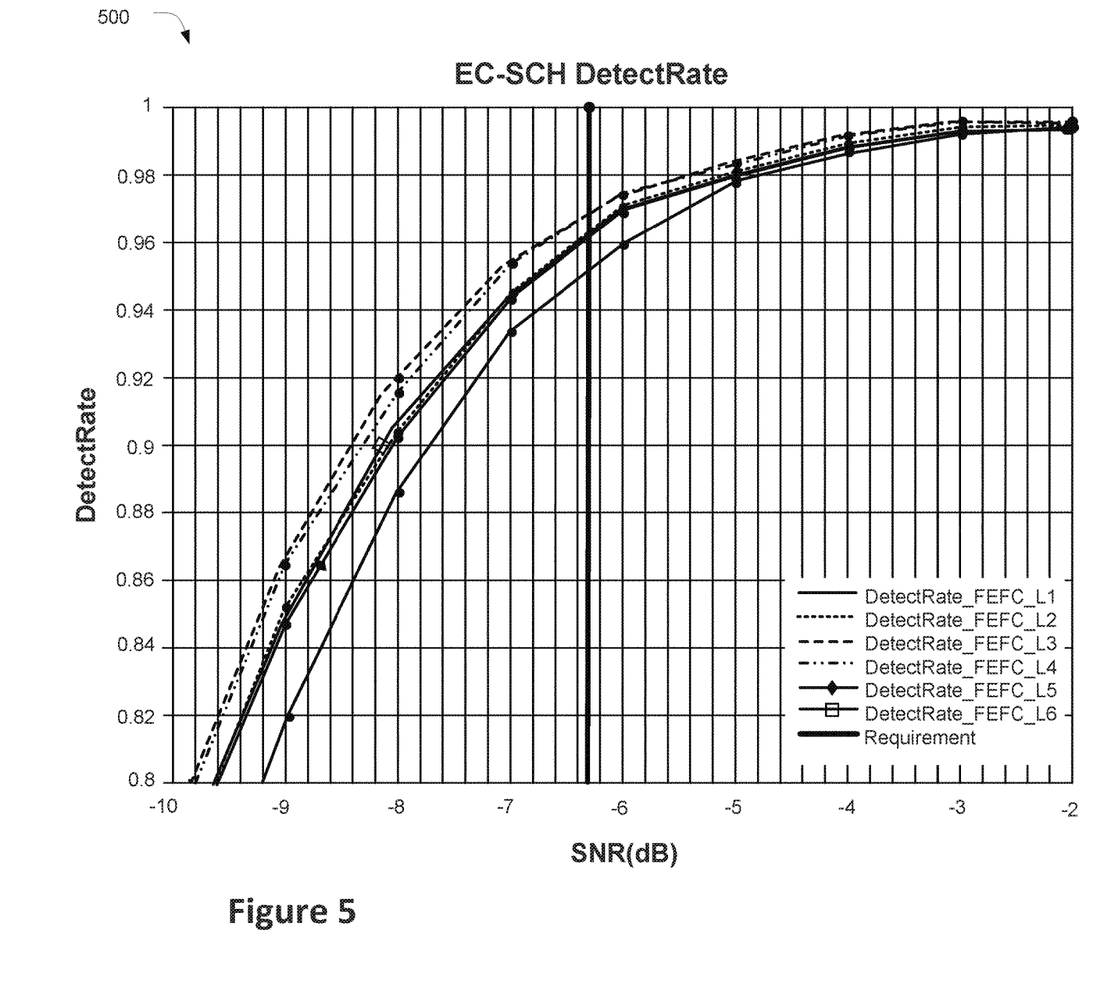
FIG. 5 illustrates extended coverage synchronization channel detection rate performance in accordance with some embodiments.

FIG. 5 illustrates EC-SCH detection rate performance in accordance with some embodiments. In the Figure, DetectRate_FEFC_L1 corresponds to EC-SCH detection rate performance with a legacy frequency offset estimation and frequency offset compensation ("FEFC"); DetectRate_FEFC_L2 corresponds to EC-SCH detection rate performance with a two-iteration FEFC; DetectRate_FEFC_L3 corresponds to EC-SCH detection rate performance with a three-iteration FEFC; DetectRate_FEFC_L4 corresponds to EC-SCH detection rate performance with a four-iteration FEFC; DetectRate_FEFC_L5 corresponds to EC-SCH detection rate performance with a five-iteration FEFC; DetectRate_FEFC_L6 corresponds to EC-SCH detection rate performance with a six-iteration FEFC; and a typical SNR (decibel) requirement. As can be seen, the best performance is again the three- or four-iteration example with an EC-SCH detection improved around 0.6 dB at 90% detection rate.

In other embodiments or other logical channels, a desired iteration number may be different as the blind repetition number (and IQ accumulation length) may differ. However, similar principles may apply.

Figure 6:
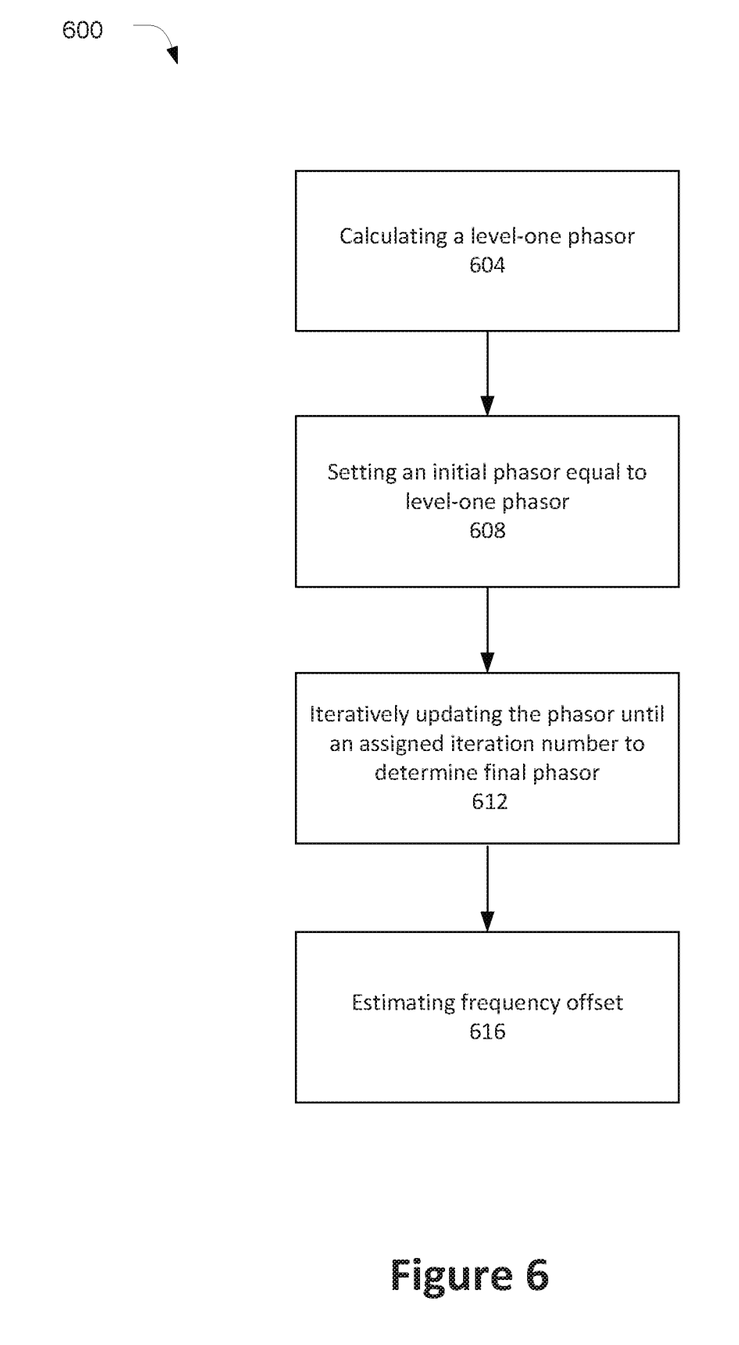
FIG. 6 illustrates an example operation flow/algorithmic structure of a frequency offset estimator in accordance with some embodiments.

FIG. 6 illustrates an example operation flow/algorithmic structure 600 of the frequency offset estimator according to some embodiments. Unless otherwise described, the operations of the operation flow/algorithmic structure 600 may be performed by the frequency offset estimator 116.

The operation flow/algorithmic structure 600 may include, at 604, calculating a level-one phasor. The level-one phasor may be calculated based on the IQ components received from the RF circuitry 112. The IQ components may correspond to a plurality of repeated bursts of an EC-SCH, for example. The level-one phasor may be calculated using Equations 5 or 6 as described above.

The operation flow/algorithmic structure 600 may further include, at 608, setting an initial, or first-iteration phasor, $R_1$, equal to the level-one phasor, $R_{L1}$.

The operation flow/algorithmic structure 600 may further include, at 612, iteratively updating the phasor until an assigned iteration number to determine a final phasor, $R_{Final}$. The iterative updating may be based on Equations 5-7 as described above.

The operation flow/algorithmic structure 600 may further include, at 616, estimating a frequency offset. The estimating of the frequency may be based on Equation 8 as described above.

In some embodiments, the final phasor or the frequency offset estimation may be provided to the frequency offset compensator 120 to use to compensate the IQ components provided to other components of the UE 108, for example, an equalizer.

Figure 7:
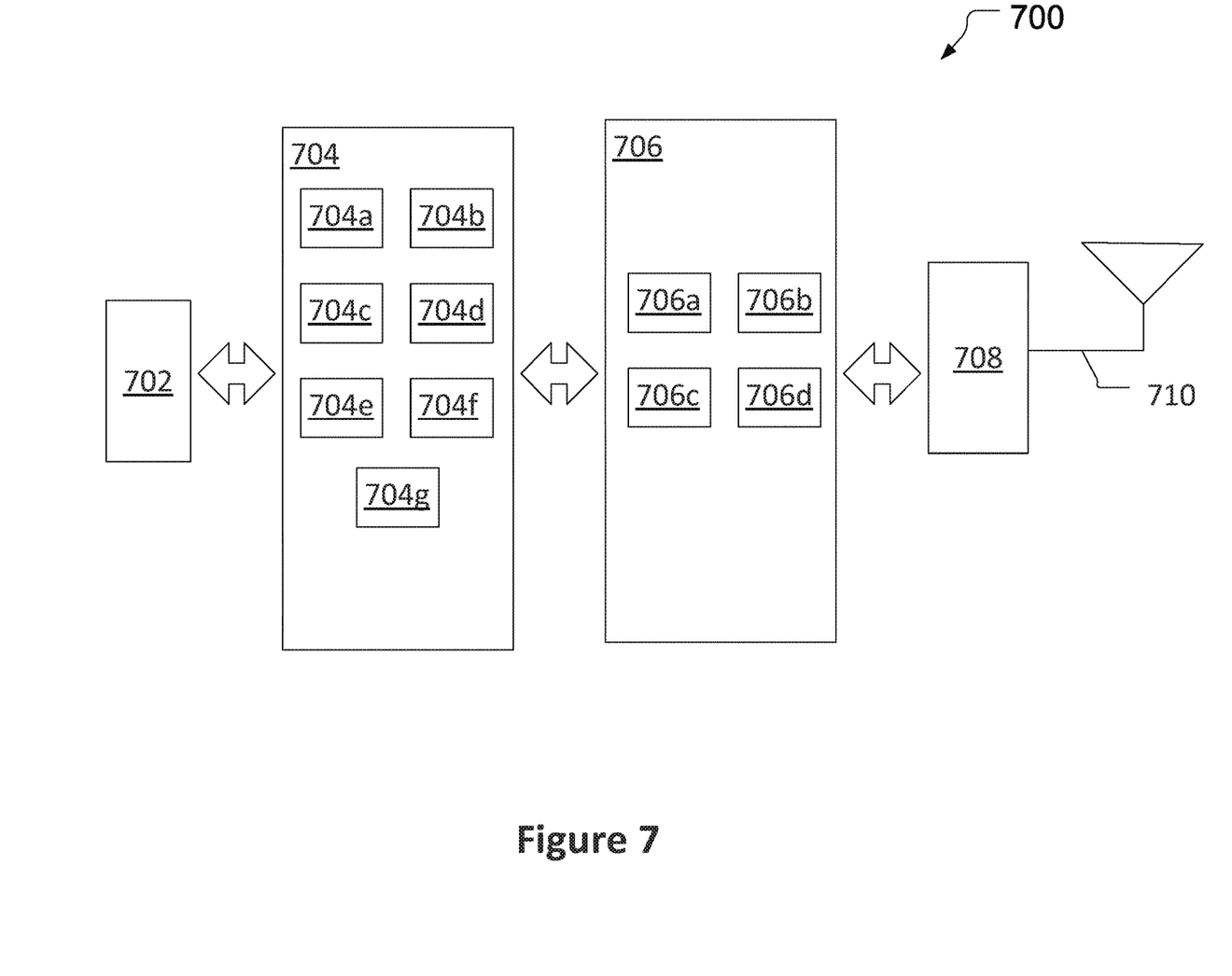
FIG. 7 illustrates example components of an electronic device in accordance with some embodiments.

Embodiments described herein may be implemented into a system using any suitably configured hardware and/or software. FIG. 7 illustrates, for one embodiment, example components of an electronic device 700. In embodiments, the electronic device 700 may be, implement, be incorporated into, or otherwise be a part of a UE such as UE 108, for example. In some embodiments, the electronic device 700 may include application circuitry 702, baseband circuitry 704, RF circuitry 706, front-end module (FEM) circuitry 108 and one or more antennas 710, operatively coupled together at least as shown above.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The application circuitry 702 may include one or more application processors.

For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be operatively coupled to and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704f. The audio DSP(s) 704f may be include elements for compression/decompression and echo cancellation and may include other suitable processing elements in other embodiments.

The baseband circuitry 704 may further include memory/storage 704g.

The memory/storage 704g may be used to load and store data and/or instructions for operations performed by the processors of the baseband circuitry 704. Memory/storage for one embodiment may include any combination of suitable volatile memory and/or non-volatile memory. The memory/storage 704g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 704g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 704 and the application circuitry 102 may be implemented together such as, for example, on a system on a chip (SOC).

In some embodiments, the baseband circuitry 704 may provide for communication compatible with one or more radio technologies. For example, in some embodiments, the baseband circuitry 704 may support communication with a GSM network, an EUTRAN network, a 5G network, and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 106a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 106a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 106d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be an LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 108 may include a power amplifier (PA) to amplify input RF signals (e.g., provided by RF circuitry 706), and one or more filters to generate RF signals for subsequent transmission (e.g., by one or more of the one or more antennas 710.

In some embodiments, the electronic device 700 may include additional elements such as, for example, memory/storage, display, camera, sensor, and/or input/output (I/O) interface.

In some embodiments, the RF circuitry 706 and/or FEM circuitry 708 may correspond to the RF circuitry 112 of the UE 108 and may receive a signal with a number of repeat bursts used for extended coverage, for example, and down-convert the signal to provide IQ components. The baseband circuitry 704 may include the frequency offset estimator 116 or frequency offset compensator 120 and may estimate a frequency offset based on an iterative calculation of phase differences between different sets of bursts of the plurality of repeated bursts and compensate for the estimated frequency offset to provide compensated IQ components for processing by other components of the baseband circuitry 704.

Figure 8:
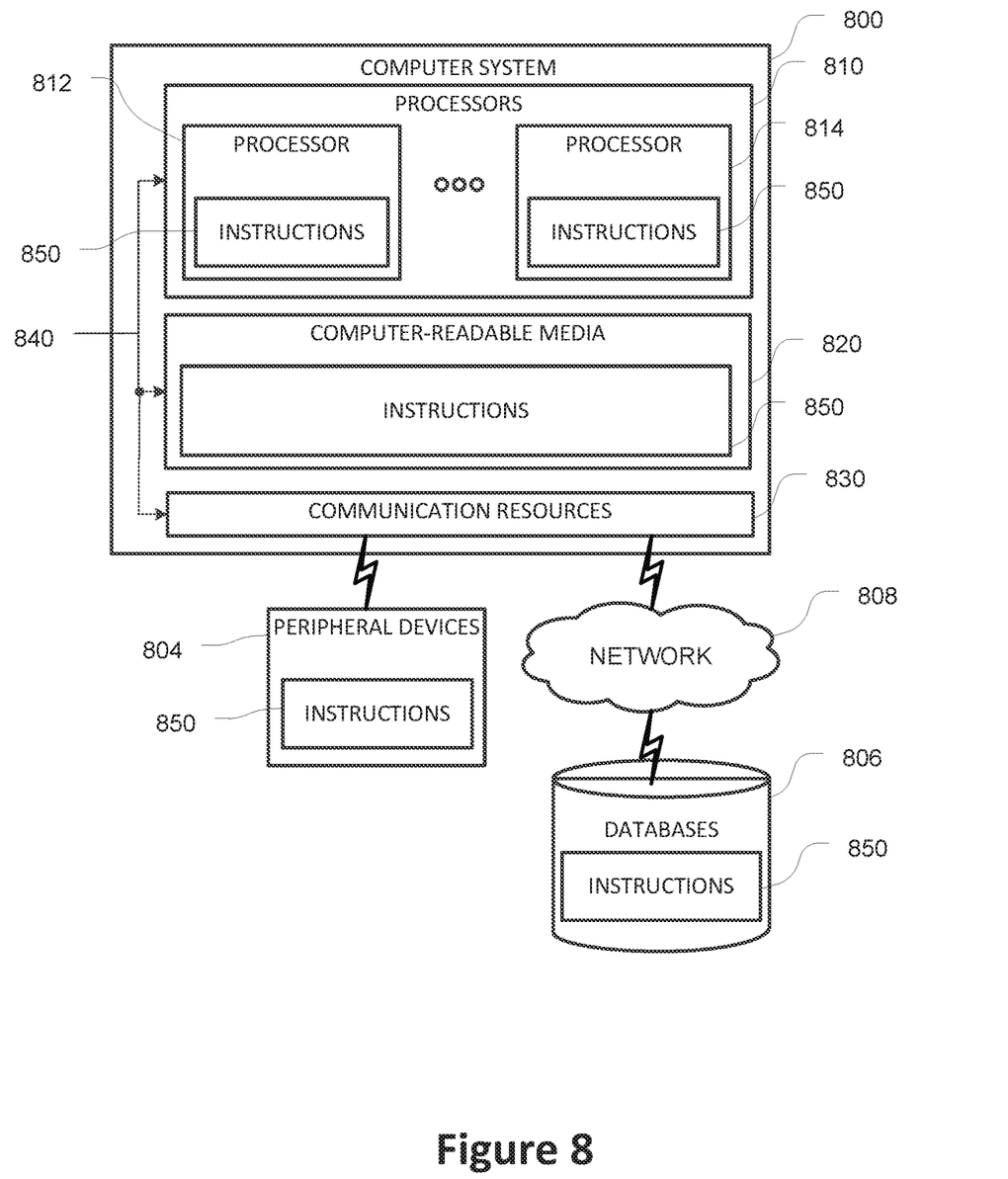
FIG. 8 illustrates the computer system in accordance with some embodiments.

FIG. 8 is a block diagram illustrating components, according to some example embodiments, able to read instructions from a machine-readable or computer-readable medium (e.g., a machine-readable storage medium) and perform any one or more of the methodologies discussed herein (for example, the techniques described with respect to operation flow/algorithmic structures of FIG. 6). Specifically, FIG. 8 shows a diagrammatic representation of computer system 800 including one or more processors (or processor cores) 810, one or more computer-readable media 820, and one or more communication resources 830, each of which are operatively coupled via one or more interconnects 840.

The processors 810 may include one or more central processing unit ("CPUs"), reduced instruction set computing ("RISC") processors, complex instruction set computing ("CISC") processors, graphics processing units ("GPUs"), digital signal processors ("DSPs") implemented as a baseband processor, for example, application specific integrated circuits ("ASICs"), radio-frequency integrated circuits (RFICs), etc. As shown, the processors 810 may include a processor 812 and a processor 814.

The computer-readable media 820 may be suitable for use to store instructions 850 that cause the computer system 800, in response to execution of the instructions 850 by one or more of the processors 810, to practice selected aspects of the present disclosure. In some embodiments, the computer-readable media 820 may be non-transitory. As shown, computer-readable storage medium 820 may include instructions 850. The instructions 850 may be programming instructions or computer program code configured to enable the computer system 800, which may be implemented as the UE 108 or the server 104, in response to execution of the instructions 850, to implement (aspects of) any of the methods or elements described throughout this disclosure related to frequency offset estimation/compensation. In some embodiments, the instructions 850 may be configured to enable a device, in response to execution of the programming instructions 850, to implement (aspects of) any of the methods or elements described throughout this disclosure related frequency offset estimation/compensation. In some embodiments, programming instructions 850 may be disposed on computer-readable media 950 that is transitory in nature, such as signals.

Any combination of one or more computer-usable or computer-readable media may be utilized as the computer-readable media 820. The computer-readable media 820 may be, for example, but not limited to, an electronic, magnetic, optical, electromagnetic, infrared, or semiconductor system, apparatus, device, or propagation medium. More specific examples (a non-exhaustive list) of the computer-readable media would include the following: an electrical connection having one or more wires, a portable computer diskette, a hard disk, RAM, ROM, an erasable programmable read-only memory (for example, EPROM, EEPROM, or Flash memory), an optical fiber, a portable compact disc read-only memory (CD-ROM), an optical storage device, a transmission media such as those supporting the Internet or an intranet, or a magnetic storage device. Note that the computer-usable or computer-readable media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable media may be any medium that can contain, store, communicate, propagate, or transport the program for use by or in connection with the instruction execution system, apparatus, or device. The computer-usable media may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As shown in FIG. 8, the instructions 850 may reside, completely or partially, within at least one of the processors 810 (e.g., within the processor's cache memory), the computer-readable media 820, or any suitable combination thereof. Furthermore, any portion of the instructions 850 may be transferred to the hardware resources 800 from any combination of the peripheral devices 804 and/or the databases 806. Accordingly, the memory of processors 810, the peripheral devices 804, and the databases 806 are additional examples of computer-readable media.

The communication resources 830 may include interconnection and/or network interface components or other suitable devices to communicate with one or more peripheral devices 804 and/or one or more remote devices 806 via a network 808. For example, the communication resources 830 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components. In some embodiments, the communication resources 830 may include a cellular modem to communicate over a cellular network, an Ethernet controller to communicate over an Ethernet network, etc.

In some embodiments, one or more components of the computer system 800 may be included as a part of the UE 108 described with respect to FIG. 1, or one or more components of the UE 108 described with respect to FIG. 1 may be included as a part of the computer system 800. For example, the frequency offset estimator 116 and frequency offset compensator 120 may include processors 810, computer-readable media 820, or communication resources 830 to facilitate operations described above with respect to the UE 108.

Some non-limiting examples are provided below.

Example 1 may include an apparatus comprising: radio frequency ("RF") circuitry to down-convert a signal from a base station to generate in-phase and quadrature ("IQ") components, wherein the signal includes one or more repeated bursts; and a frequency offset estimator operatively coupled to the RF circuitry, the frequency offset estimator to estimate a frequency offset based on the IQ components and an iterative calculation of phase differences between different sets of bursts of the one or more repeated bursts.

Example 2 may include the apparatus of example 1, wherein the frequency offset estimator is further configured to calculate a first phasor ("$R_{L1}$") based on a distance between first and second bursts of the one or more repeated bursts.

Example 3 may include the apparatus of example 1 or 2, wherein the frequency offset estimator is to determine a level-n phasor ("$R_{Ln}$") carrying a phase difference with different distances based on:

$$R_{Ln} = \frac{1}{M}\sum_{j=n}^{M-1}\sum_{k=0}^{N-1} x(j,k) * conj(x(j-n,k)), n = 1, 2, \ldots, M,$$

n=1, 2, ..., M, where x(j,k) is a $k^{th}$ sample of a $j^{th}$ burst, M is an assigned iteration number, and N is a number of data used for frequency offset estimation in one burst.

Example 4 may include the apparatus of example 3, wherein, to estimate the frequency offset, the frequency offset estimator is to set a phasor ("R") equal to a level-one phasor ("$R_{L1}$").

Example 5 may include the apparatus of example 4, wherein, to estimate the frequency offset, the frequency offset estimator is to iteratively update the phasor until an assigned iteration number to determine a final phasor ("$R_M$") based on $$R_n = R_{n-1} * e^{\frac{angle(R_{Ln}*conj(R_{n-1})^n)}{n}j}, n = 1, 2, \ldots, M,$$

n=1, 2, ..., M, where angle(*) is an operation to calculate a phase of one complex value.

Example 6 may include the apparatus of example 5, wherein, the frequency offset estimator is to estimate the frequency offset ("Δf") based on:

$$\Delta f = \frac{angle(R_M)}{2\pi * 1250 T_s},$$

where $T_s$ is a basic time unit value.

Example 7 may include the apparatus of any one of examples 1-6, further comprising: a frequency offset compensator operatively coupled with the frequency offset estimator to generate compensated IQ components based on the IQ components and the estimate of the frequency offset.

Example 8 may include the apparatus of any one of examples 1-7, wherein the plurality of repeated bursts are extended coverage synchronization channel ("EC-SCH") bursts and the apparatus is a cellular Internet of things ("CIoT") device.

Example 9 may include one or more computer-readable media having instructions that, when executed, cause a device to: calculate a level-one phasor based on in-phase and quadrature ("IQ") components; set a phasor equal to the level-one phasor; iteratively update the phasor until an assigned iteration number to determine a final phasor; and estimate a frequency offset based on the final phasor.

Example 10 may include the one or more computer-readable media of example 9, wherein the level-one phasor is to be calculated based on IQ components of adjacent bursts of a plurality of repeated bursts.

Example 11 may include the one or more computer-readable media of example 10, wherein the plurality of repeated bursts comprise extended coverage synchronization channel bursts.

Example 12 may include the one or more computer-readable media of example 10 or 11, wherein the phasor carries a phase difference based on distance between the adjacent bursts.

Example 13 may include the one or more computer-readable media of any one of examples 9-12, wherein the instructions, when executed, further cause the device to determine a level-n phasor ("$R_{Ln}$") carrying a phase difference with different distances between a plurality of repeated bursts given by:

$$R_{Ln} = \frac{1}{M}\sum_{j=n}^{M-1}\sum_{k=0}^{N-1} x(j,k) * conj(x(j-n,k)), n = 1, 2, \ldots, M,$$

where x(j,k) is a $k^{th}$ sample of a $j^{th}$ burst, M is an assigned iteration number, and N is a number of data used for frequency offset estimation in one burst.

Example 14 may include the one or more computer-readable media of example 9 wherein the instructions, when executed, further cause the device to iteratively update the phasor ("R") to determine the final phasor ("$R_M$") based on $$R_n = R_{n-1} * e^{\frac{angle(R_{Ln}*conj(R_{n-1})^n)}{n}j}, n = 1, 2, \ldots, M,$$

n=1, 2, ..., M, where angle(*) is an operation to calculate a phase of one complex value.

Example 15 may include the one or more computer-readable media of example 14, wherein the instructions, when executed, further cause the device to estimate the frequency offset ("Δf") based on:

$$\Delta f = \frac{angle(R_M)}{2\pi * 1250 T_s},$$

where $T_s$ is a basic time unit value.

Example 16 may include an apparatus comprising: means for receiving in-phase and quadrature ("IQ") components of a plurality of repeated bursts and for estimating a frequency offset based on an iterative calculation of phase differences between different sets of bursts of the plurality of repeated bursts; and means for compensating for the frequency offset to provide compensated IQ components.

Example 17 may include the apparatus of example 16, wherein the means for estimating the frequency offset is to determine a level-n phasor ("$R_{Ln}$") carrying a phase difference with different distances given by:

$$R_{Ln} = \frac{1}{M} \sum_{j=n}^{M-1} \sum_{k=0}^{N-1} x(j,k) * conj(x(j-n,k)), n = 1, 2, \ldots, M,$$

n=1, 2, ..., M, where x(j,k) is a $k^{th}$ sample of a $j^{th}$ burst, M is an assigned iteration number, and N is a number of data used for frequency offset estimation in one burst.

Example 18 may include the apparatus of example 17, wherein the means for estimating the frequency offset is to set a phasor ("R") equal to a level-one phasor ("$R_{L1}$").

Example 19 may include the apparatus of example 18, wherein the means for estimating the frequency offset is to iteratively update the phasor until an assigned iteration number to determine a final phasor ("$R_M$") based on $$R_n = R_{n-1} * e^{\frac{angle(R_{Ln} * conj(R_{n-1})^n}{n}j}, n = 1, 2, \ldots, M,$$

n=1, 2, ..., M, where angle(*) is an operation to calculate a phase of one complex value.

Example 20 may include the apparatus of example 19, wherein the means for estimating the frequency offset is to estimate the frequency offset ("Δf") based on:

$$\Delta f = \frac{angle(R_M)}{2\pi * 1250 T_s},$$

where $T_s$ is a basic time unit value.

Example 21 may include the apparatus of any one of examples 16-20, wherein the plurality of repeated bursts are extended coverage synchronization channel ("EC-SCH") bursts.

Example 22 may include the apparatus of any one of examples 16-21, wherein the apparatus is a cellular Internet of things ("CIoT") device.

Example 23 may include a method comprising: receiving a signal from a base station, the signal to include a plurality of repeated bursts; down-converting the signal to provide in-phase and quadrature ("IQ") components; and estimating, based on the IQ components, a frequency offset based on an iterative calculation of phase differences between different sets of bursts of the plurality of repeated bursts.

Example 24 may include the method of example 23, estimating the frequency offset includes calculating a first phasor ("$R_{L1}$") carrying a phase difference based on distance between first and second bursts of the plurality of repeated bursts.

Example 25 may include the method of example 23, wherein estimating the frequency offset includes determining a level-n phasor ("$R_{Ln}$") carrying a phase difference with different distances given by:

$$R_{Ln} = \frac{1}{M} \sum_{j=n}^{M-1} \sum_{k=0}^{N-1} x(j,k) * conj(x(j-n,k)), n = 1, 2, \ldots, M,$$

n=1, 2, ..., M, where x(j,k) is a $k^{th}$ sample of a $j^{th}$ burst, M is an assigned iteration number, and N is a number of data used for frequency offset estimation in one burst.

Example 26 may include the method of example 25, wherein estimating the frequency offset include setting a phasor ("R") equal to a level-one phasor ("$R_{L1}$").

Example 27 may include the method of example 26, wherein estimating the frequency offset includes iteratively updating the phasor until an assigned iteration number to determine a final phasor ("$R_M$") based on $$R_n = R_{n-1} * e^{\frac{angle(R_{Ln} * conj(R_{n-1})^n}{n}j}, n = 1, 2, \ldots, M,$$

n=1, 2, ..., M, where angle(*) is an operation to calculate a phase of one complex value.

Example 28 may include the method of example 27, wherein estimating the frequency offset ("Δf") is based on:

$$\Delta f = \frac{angle(R_M)}{2\pi * 1250 T_s},$$

where $T_s$ is a basic time unit value.

Example 29 may include the method of any one of examples 23-28, wherein the plurality of repeated bursts are extended coverage synchronization channel ("EC-SCH") bursts.

Example 30 may include the method of any one of examples 23-29, wherein the method is to be employed by a cellular Internet of things ("CIoT") device.

Example 31 may include a method comprising: calculating a level-one phasor based on in-phase and quadrature ("IQ") components; setting a phasor equal to the level-one phasor; iteratively updating the phasor until an assigned iteration number to determine a final phasor; and estimating a frequency offset based on the final phasor.

Example 32 may include the method of example 31, further comprising calculating the level-one phasor based on IQ components of adjacent bursts of a plurality of repeated bursts.

Example 33 may include the method of example 32, wherein the plurality of repeated bursts comprise extended coverage synchronization channel bursts.

Example 34 may include the method of example 32, wherein the phasor carries a phase difference based on distance between the adjacent bursts.

Example 35 may include the method of example 31, further comprising: determining a level-n phasor ("$R_{Ln}$") carrying a phase difference with different distances between a plurality of repeated bursts given by:

$$R_{Ln} = \frac{1}{M} \sum_{j=n}^{M-1} \sum_{k=0}^{N-1} x(j,k) * conj(x(j-n,k)), n = 1, 2, \ldots, M,$$

n=1, 2, ..., M, where x(j,k) is a $k^{th}$ sample of a $j^{th}$ burst, M is an assigned iteration number, and N is a number of data used for frequency offset estimation in one burst.

Example 36 may include the method of any one of examples 31-35, wherein iteratively updating the phasor ("R") to determine the final phasor ("$R_M$") based on $$R_n = R_{n-1} * e^{\frac{angle(R_{Ln} * conj(R_{n-1})^n}{n}j}, n = 1, 2, \ldots, M,$$

n=1, 2, ..., M, where angle(*) is an operation to calculate a phase of one complex value.

Example 37 may include the method of example 36, wherein estimating the frequency offset ("Δf") is based on:

$$\Delta f = \frac{\text{angle}(R_M)}{2\pi * 1250 T_S},$$

where $T_s$ is a basic time unit value.

Example 38 may include a method comprising: receiving in-phase and quadrature ("IQ") components of a plurality of repeated bursts and for estimating a frequency offset based on an iterative calculation of phase differences between different sets of bursts of the plurality of repeated bursts; and compensating for the frequency offset to provide compensated IQ components.

Example 39 may include the method of example 38, wherein estimating the frequency offset comprises determining a level-n phasor ("$R_{Ln}$") carrying a phase difference with different distances given by:

$$R_{Ln} = \frac{1}{M} \sum_{j=n}^{M-1} \sum_{k=0}^{N-1} x(j,k) * \text{conj}(x(j-n,k)), n = 1, 2, \ldots, M,$$

n=1, 2, ..., M, where x(j,k) is a $k^{th}$ sample of a $j^{th}$ burst, M is an assigned iteration number, and N is a number of data used for frequency offset estimation in one burst.

Example 40 may include the method of example 39, wherein estimating the frequency offset comprises setting a phasor ("R") equal to a level-one phasor ("$R_{L1}$").

Example 41 may include the method of example 40, wherein estimating the frequency offset comprises iteratively updating the phasor until an assigned iteration number to determine a final phasor ("$R_M$") based on $$R_n = R_{n-1} * e^{\frac{\text{angle}(R_{Ln} * \text{conj}(R_{n-1})^n)}{n}} j, n = 1, 2, \ldots, M,$$

n=1, 2, ..., M, where angle(*) is an operation to calculate a phase of one complex value.

Example 42 may include the method of example 41, wherein estimating the frequency offset ("Δf") is based on:

$$\Delta f = \frac{\text{angle}(R_M)}{2\pi * 1250 T_S},$$

where $T_s$ is a basic time unit value.

Example 43 may include the method of any one of examples 38-42, wherein the plurality of repeated bursts are extended coverage synchronization channel ("EC-SCH") bursts.

Example 44 may include the method of any one of examples 38-43, wherein the method is to be performed by a cellular Internet of things ("CIoT") device.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

The invention claimed is:

1. An apparatus comprising:
   radio frequency ("RF") circuitry to down-convert a signal from a base station to generate in-phase and quadrature ("IQ") components, wherein the signal includes a plurality of repeated extended coverage-synchronization channel ("EC-SCH") bursts; and
   a frequency offset estimator operatively coupled to the RF circuitry, the frequency offset estimator to estimate a frequency offset based on the IQ components and an iterative calculation of phase differences between different sets of bursts of the plurality of repeated EC-SCH bursts.

2. The apparatus of claim 1, wherein the frequency offset estimator is further configured to calculate a first phasor ("$R_{L1}$") based on a distance between first and second bursts of the plurality of repeated EC-SCH bursts.

3. The apparatus of claim 1, further comprising:
   a frequency offset compensator operatively coupled with the frequency offset estimator to generate compensated IQ components based on the IQ components and the estimate of the frequency offset.

4. The apparatus of claim 1, wherein the apparatus is a cellular Internet of things ("CIoT") device.

5. An apparatus comprising:
   radio frequency ("RF") circuitry to down-convert a signal from a base station to generate in-phase and quadrature ("IQ") components, wherein the signal includes one or more repeated bursts; and
   a frequency offset estimator operatively coupled to the RF circuitry, the frequency offset estimator to estimate a frequency offset based on the IQ components and an iterative calculation of phase differences between different sets of bursts of the one or more repeated bursts, wherein the frequency offset estimator is to determine a level-n phasor ("$R_{Ln}$") carrying a phase difference with different distances based on:

$$R_{Ln} = \frac{1}{M} \sum_{j=n}^{M-1} \sum_{k=0}^{N-1} x(j,k) * \text{conj}(x(j-n,k)), n = 1, 2, \ldots, M,$$

where x(j,k) is a $k^{th}$ sample of a $j^{th}$ burst, M is an assigned iteration number, and N is a number of data used for frequency offset estimation in one burst.

6. The apparatus of claim 5, wherein, to estimate the frequency offset, the frequency offset estimator is to set a phasor ("R") equal to a level-one phasor ("$R_{L1}$").

7. The apparatus of claim 6, wherein, to estimate the frequency offset, the frequency offset estimator is to iteratively update the phasor until the assigned iteration number to determine a final phasor ("$R_M$") based on $$R_n = R_{n-1} * e^{\frac{\text{angle}(R_{Ln} * \text{conj}(R_{n-1})^n)}{n}} j, n = 1, 2, \ldots, M,$$

where angle(*) is an operation to calculate a phase of one complex value.

8. The apparatus of claim 7, wherein the frequency offset estimator is to estimate the frequency offset ("Δf") based on:

$$\Delta f = \frac{\text{angle}(R_M)}{2\pi * 1250 T_S},$$

where $T_s$ is a basic time unit value.

9. One or more non-transitory, computer-readable media having instructions that, when executed, cause a device to:
calculate a level-one phasor based on in-phase and quadrature ("IQ") components of adjacent bursts of a plurality of repeated extended coverage-synchronization channel (EC-SCH) bursts;
set a phasor equal to the level-one phasor;
iteratively update the phasor until an assigned iteration number to determine a final phasor; and
estimate a frequency offset based on the final phasor.

10. The one or more non-transitory, computer-readable media of claim 9, wherein the phasor carries a phase difference based on distance between the adjacent bursts.

11. The one or more non-transitory, computer-readable media of claim 9, wherein the instructions, when executed, further cause the device to determine a level-n phasor ("$R_{Ln}$") carrying a phase difference with different distances between a plurality of repeated EC-SCH bursts given by:

$$R_{Ln} = \frac{1}{M}\sum_{j=n}^{M-1}\sum_{k=0}^{N-1}x(j,k)*conj(x(j-n,k)), n = 1, 2, \ldots, M,$$

where x(j,k) is a $k^{th}$ sample of a $j^{th}$ burst, M is an assigned iteration number, and N is a number of data used for frequency offset estimation in one burst.

12. The one or more non-transitory, computer-readable media of claim 9, wherein the instructions, when executed, further cause the device to iteratively update the phasor ("R") to determine the final phasor ("$R_M$") based on $$R_n = R_{n-1} * e^{\frac{\text{angle}(R_{Ln}*conj(R_{n-1})^n)}{n}} j, n = 1, 2, \ldots, M,$$

where angle(*) is an operation to calculate a phase of one complex value.

13. The one or more non-transitory, computer-readable media of claim 12, wherein the instructions, when executed, further cause the device to estimate the frequency offset ("$\Delta f$") based on:

$$\Delta f = \frac{\text{angle}(R_M)}{2\pi * 1250 T_S},$$

where $T_s$ is a basic time unit value.

14. An apparatus comprising:
means for receiving in-phase and quadrature ("IQ") components of a plurality of repeated extended coverage-synchronization channel ("EC-SCH") bursts and for estimating a frequency offset based on an iterative calculation of phase differences between different sets of bursts of the plurality of repeated EC-SCH bursts; and
means for compensating for the frequency offset to provide compensated IQ components.

15. The apparatus of claim 14, wherein the means for estimating the frequency offset is to determine a level-n phasor ("$R_{Ln}$") carrying a phase difference with different distances given by:

$$R_{Ln} = \frac{1}{M}\sum_{j=n}^{M-1}\sum_{k=0}^{N-1}x(j,k)*conj(x(j-n,k)), n = 1, 2, \ldots, M,$$

where x(j,k) is a $k^{th}$ sample of a $j^{th}$ burst, M is an assigned iteration number, and N is a number of data used for frequency offset estimation in one burst.

16. The apparatus of claim 15, wherein the means for estimating the frequency offset is to set a phasor ("R") equal to a level-one phasor ("$R_{L1}$").

17. The apparatus of claim 16, wherein the means for estimating the frequency offset is to iteratively update the phasor until an assigned iteration number to determine a final phasor ("$R_M$") based on $$R_n = R_{n-1} * e^{\frac{\text{angle}(R_{Ln}*conj(R_{n-1})^n)}{n}} j, n = 1, 2, \ldots, M,$$

where angle(*) is an operation to calculate a phase of one complex value.

18. The apparatus of claim 17, wherein the means for estimating the frequency offset is to estimate the frequency offset ("$\Delta f$") based on:

$$\Delta f = \frac{\text{angle}(R_M)}{2\pi * 1250 T_S},$$

where $T_s$ is a basic time unit value.

19. The apparatus of claim 14, wherein the apparatus is a cellular Internet of things ("CIoT") device.

* * * * *